(12) United States Patent
Shi

(10) Patent No.: US 8,043,684 B2
(45) Date of Patent: Oct. 25, 2011

(54) LOW TRANSIENT AND STEADY STATE THERMAL STRESS DISK SHAPED COMPONENTS

(75) Inventor: Jun Shi, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 601 days.

(21) Appl. No.: 12/031,119

(22) Filed: Feb. 14, 2008

(65) Prior Publication Data
US 2009/0208752 A1 Aug. 20, 2009

(51) Int. Cl.
*B29C 69/00* (2006.01)
*B32B 9/04* (2006.01)
*H05B 6/00* (2006.01)

(52) U.S. Cl. ... 428/66.6; 416/185; 428/64.1; 428/411.1; 428/372

(58) Field of Classification Search ............ 428/66.6, 428/64.1, 472; 416/185
See application file for complete search history.

(56) References Cited

U.S. PATENT DOCUMENTS

| | | | |
|---|---|---|---|
| 4,335,997 A * | 6/1982 | Ewing et al. | 416/185 |
| 6,228,437 B1 | 5/2001 | Schmidt | |
| 6,284,323 B1 | 9/2001 | Maloney | |
| 6,451,416 B1 | 9/2002 | Holowczak et al. | |
| 6,648,597 B1 | 11/2003 | Widrig et al. | |
| 6,696,144 B2 | 2/2004 | Holowczak et al. | |
| 6,709,230 B2 | 3/2004 | Morrison et al. | |
| 6,730,422 B2 | 5/2004 | Litton et al. | |
| 6,758,653 B2 | 7/2004 | Morrison | |
| 6,881,036 B2 | 4/2005 | Hornick et al. | |
| 6,902,836 B2 | 6/2005 | Eaton et al. | |
| 6,924,040 B2 | 8/2005 | Maloney | |
| 6,986,940 B1 | 1/2006 | Carper | |
| 7,063,894 B2 | 6/2006 | Sun et al. | |
| 7,278,830 B2 | 10/2007 | Vetters | |
| 7,284,957 B2 | 10/2007 | Hornick et al. | |
| 7,291,407 B2 | 11/2007 | Merrill et al. | |
| 2003/0049470 A1 * | 3/2003 | Maloney | 428/472 |

OTHER PUBLICATIONS

M.P. Rao et al., Laminar Ceramics That Exhibit a Threshold Strength, Oct. 1, 1999, pp. 102-105, vol. 286.
M. Szafran et al., Ceramic matrix composites with gradient concentration of metal particles, Journal of the European Ceramic Society, 2006.
Robert J. Moon et al., Layer orientation effects on the R-curve behavior of multilayered alumina-zirconia composites, Composites: Part B, 2006, pp. 449-458.
Yoshiaki Inagaki et al., High performance porous silicon nitrides, Journal of the European Society, 2002, pp. 2489-2494.
Scott C. Thompson et al., Stepwise-Graded Si3N4-SiC Ceramics with Improved Wear Properties, Journal of the American Ceramic Society, 2002, pp. 2059-2064, vol. 85, No. 8.

* cited by examiner

*Primary Examiner* — Brent O'Hern
(74) *Attorney, Agent, or Firm* — Bachman & LaPointe, P.C.

(57) ABSTRACT

A process for manufacturing a disk shaped component comprising fabricating a disk shaped component using a composite material having at least a first material and a second material, wherein the first material is disposed at and proximate to a center portion of the disk shaped component and the second material is disposed at and proximate to a rim of the disk shaped component, wherein the first material comprises a first coefficient of thermal expansion, a first stress value and a first oxidation resistance, and the second material comprises a second coefficient of thermal expansion, a second stress value and a second oxidation resistance, wherein the first coefficient of thermal expansion is greater than the second coefficient of thermal expansion, the first stress value is greater than the second stress value and the first oxidation resistance is less than the second oxidation resistance.

7 Claims, 4 Drawing Sheets

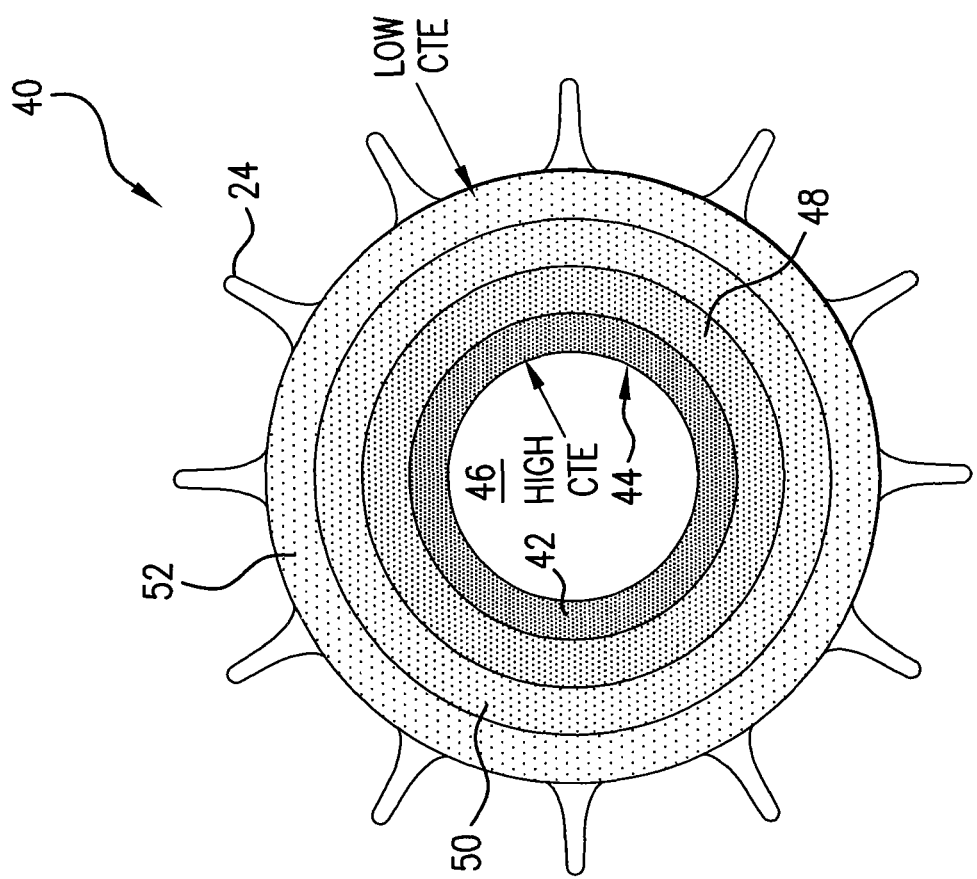
FIG. 4
OXIDATION RESISTANCE
LOW 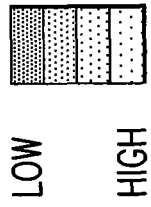 HIGH
CTE/STRENGTH/DENSITY
HIGH 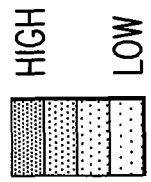 LOW

LOW TRANSIENT AND STEADY STATE THERMAL STRESS DISK SHAPED COMPONENTS

FIELD OF THE INVENTION

The invention relates to disk shaped components and, more particularly, relates to low transient thermal stress disk shaped components.

BACKGROUND OF THE INVENTION

Disk shaped components are generally subjected to two major types of loading during operation. The first loading type is the centrifugal force due to disk rotation. The second loading type arises from temperature gradient in the radial direction of the disk. The relative magnitudes of these two types of loading depend upon the rotation speed, density of the disk material and the severity of the temperature gradient. In general, the centrifugal load tends to generate more stress than the thermal load, but the thermal load could also have a significant impact upon the disk's mechanical integrity.

Referring now to FIGS. 1 and 2, for purposes of example, the disk shaped component may be a turbine disk commonly used in various engines. In FIG. 1, a turbine disk 10 is enclosed within a turbine support casing 22 of a gas turbine engine 20. The turbine disk 10 includes rotor blades 24 mounted thereto and disposed within a hot combustion gas stream 18 between two vanes 26, 28. The turbine disk 10 is normally cooled by compressor bleed air 12 flowing from the disk bore 14 to the disk rim 16, where the air is discharged into a hot gas stream 18. With the rim 16 being heated by the hot combustion gas stream 18, the temperature gradient in the disk 10 is such that the rim 16 is hotter than the disk bore 14. The hotter rim 16 would expand more than the relatively cooler bore 14 assuming the same coefficient of thermal expansion (CTE) for the two regions. The mismatch in thermal growth generates tensile thermal stress at the bore 14 and compressive stress at the rim 16. Since the tensile stress due to centrifugal force tends to peak at the disk bore 14, the combined thermal and mechanical stress reaches a maximum also at the bore 14.

Under both loading conditions, peak tensile stresses occur at the disk center or disk bore and therefore reinforce each other, creating the worst stress situation in the disk. For the bored disk, the peak stress is twice that for a solid disk. Although it would be ideal to always utilize a solid disk, it is often necessary to have a bore in a disk in order to pass cooling air or integrate a shaft of a front drive from, e.g., generator, propeller, etc., as illustrated in FIG. 1. These circumstances sometimes make it difficult to meet the requisite disk mechanical integrity requirements, especially for materials of relatively low strength.

Therefore, there exists a need for lowering the thermal stress of a bored disk in order to improve the overall mechanical integrity.

SUMMARY OF THE INVENTION

In accordance with one aspect of the present disclosure, a process for manufacturing a disk shaped component broadly comprises fabricating a disk shaped component using a composite material having at least a first material and a second material, wherein the first material is disposed at and proximate to a center portion of the disk shaped component and the second material is disposed at and proximate to a rim of the disk shaped component, wherein the first material comprises a first coefficient of thermal expansion, a first stress value and a first oxidation resistance, and the second material comprises a second coefficient of thermal expansion, a second stress value and a second oxidation resistance, wherein the first coefficient of thermal expansion is greater than the second coefficient of thermal expansion, the first stress value is greater than the second stress value and said first oxidation resistance is less than the second oxidation resistance.

In accordance with another aspect of the present disclosure, a process for manufacturing a disk shaped component, broadly comprises the steps of fabricating a disk shaped component using a composite material having at least a first phase disposed at or proximate to a center portion of the disk shaped component and a second phased disposed at or proximate to a rim of the disk shaped component; and infiltrating at least a portion of the second phase with at least one material, wherein the first phase comprises a first coefficient of thermal expansion, a first stress value and a first oxidation resistance, and the second phase comprises a second coefficient of thermal expansion, a second stress value and a second oxidation resistance, wherein the first coefficient of thermal expansion is greater than the second coefficient of thermal expansion, the first stress value is greater than the second stress value and the first oxidation resistance is less than the second oxidation resistance.

In accordance with yet another aspect of the present disclosure, a disk shaped component broadly comprises a center portion having a bore; and a rim concentrically disposed about the center portion, wherein the disk shaped component composed of a composite material having at least a first material disposed at or proximate to the center portion and a second material disposed at or proximate to the rim, wherein the first material comprises a first coefficient of thermal expansion, a first stress value and a first oxidation resistance, and the second material comprises a second coefficient of thermal expansion, a second stress value and a second oxidation resistance, wherein the first coefficient of thermal expansion is greater than the second coefficient of thermal expansion, the first stress value is greater than said second stress value and said first oxidation resistance is less than the second oxidation resistance.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 4 is an exemplary disk shaped component of the present disclosure.

Like reference numbers and designations in the various drawings indicate like elements.

DETAILED DESCRIPTION

Figure 1:
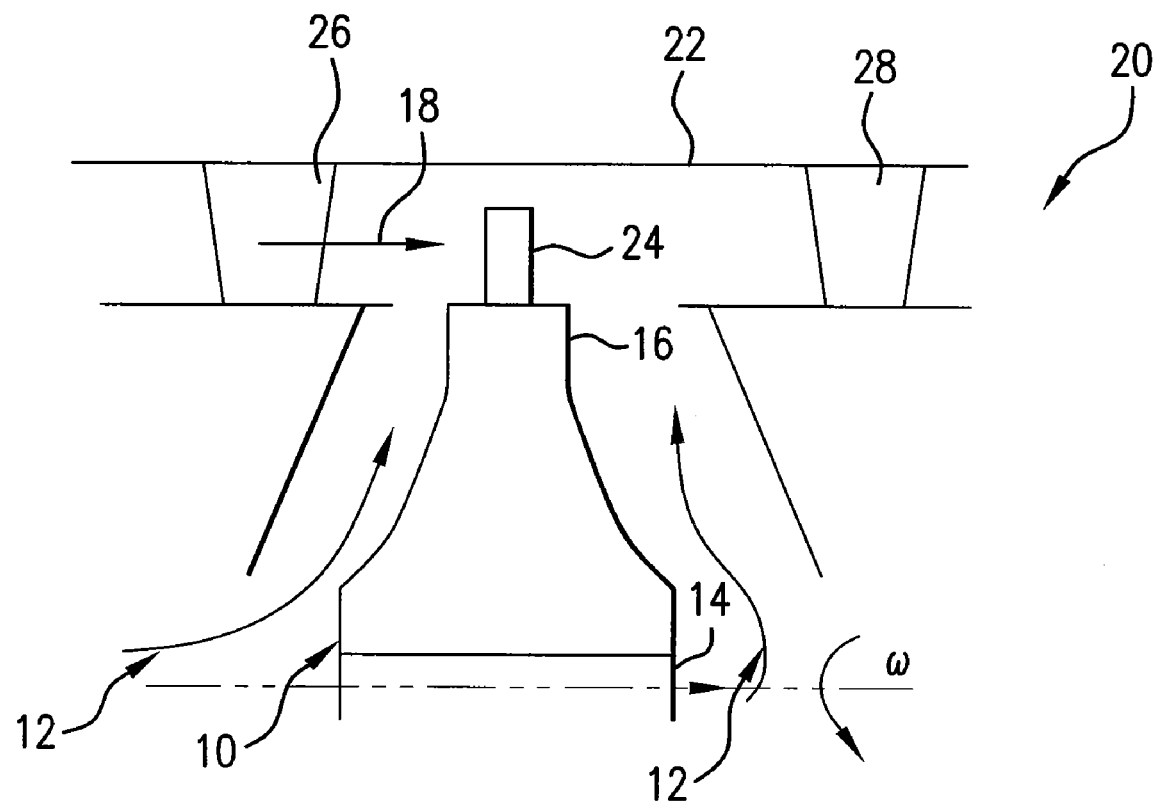
FIG. 1 is a cross-sectional view of a gas turbine equipped with a turbine disk of the prior art.
Figure 2:
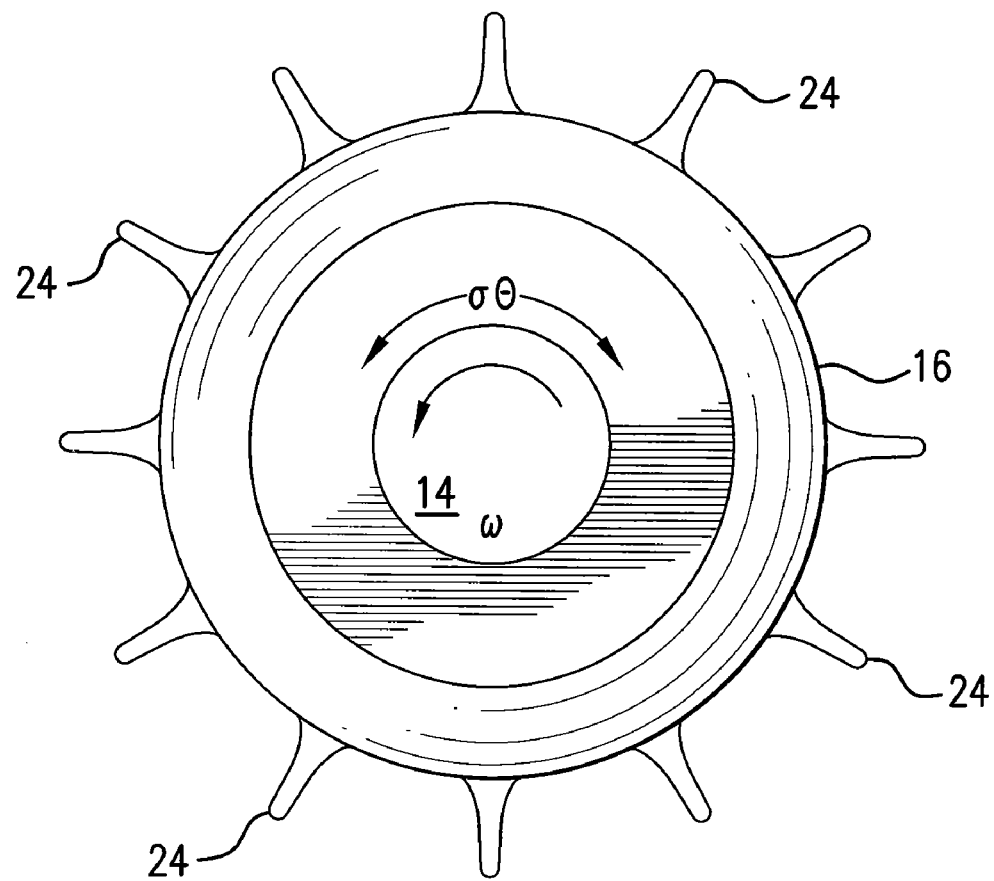
FIG. 2 is the turbine disk of FIG. 1.

As used herein, the phrase "different materials" such as "the first material and second material are different materials" means the first material and the second material are not both ceramic materials and the graded composition is not composed of only ceramic materials.

The present disclosure examines mitigating the tensile stress at the disk bore by reducing the thermal stress throughout the disk shaped component. The exemplary disk shaped components described herein are composed of a composite material designed to at least substantially reduce and/or eliminate the problems associated with severe thermal stress (es) experienced by disk shaped components of the prior art.

The term "graded composition" means any one of the following: (1) a composition composed of different materials such as metal, ceramic, metal alloy, composite particle, mixed powders, multiple metals or ceramics, and the like; (2) a composition composed of materials having different morphologies, e.g., spherical, blocky, acicular, whiskers, fibrous, and the like; (3) a composition composed of materials having different microstructures, e.g., amorphous, crystalline, crystalline phase, and the like; or (4) a composition composed of materials exhibiting the physical properties of the aforementioned compositions (1), (2) and (3), wherein the composition exhibits a graded structure such as linear, non-linear, step functions, quadratic, polynomial, point defects and other mathematical strategies for generation of grading as known to one of ordinary skill in the art.

The materials mentioned in describing the aforementioned compositions may be produced using suitable fabrication techniques including solid freeform fabrication technologies (SFF) or rapid manufacturing techniques such as fused deposition modeling (FDM), extrusion freeform fabrication (EFF), laser-enhanced net shaping (LENS), 3-dimensional printing (3DP), ink jet printing, selective laser sintering (SLS) and the like; combinations comprising at least one of the foregoing techniques, and the like. SFF techniques can produce parts from metal, ceramic and polymers, as well as mixed or composite powders and alloys. Certain techniques are more amenable to the use of powder-based materials while other techniques are more suitable for bulk materials in wire or vapor form. For example, FDM is an extrusion-based process for thermoplastics that has been modified to incorporate metal, ceramic and mixed powders suitable for fabricating metal, ceramic and mixed metal/ceramic objects. Also, EFF is used to fabricate functionally graded materials (FGM) by extrusion of two dissimilar materials. Generally, FGMs consist of a synergistic combination of two materials, e.g., a metal and a ceramic. However, it is conceivable that FGMs could consist of two or more dissimilar metal or ceramic phases having a continuous composition gradient between their respective end members, e.g., ceramic phase 1 and ceramic phase 2. SLS techniques permit sintering polymer coated metal or ceramic powders. Other laser-based techniques such as LENS are used to directly melt a wire or powder feedstock of the target composition. In addition to the fabrication techniques described above, the composite material may form a first phase and a second phase, where the second phase is composed of at least one and/or a plurality of pores, that is, a residual porosity. The residual porosity may be infiltrated with a metal such as copper or bronze, or other aforementioned material, to densify the part and create a "composite" part containing uniformly distributed steel and copper, for example. The residual porosity may also be infiltrated with a polymer, polymer blend or filled polymer system designed to convert to select metal and/or ceramic phase(s). One example of such a method is described in U.S. Pat. No. 6,228,437 to Schmidt, assigned to United Technologies Corporation, which is incorporated by reference herein in its entirety.

Figure 3:
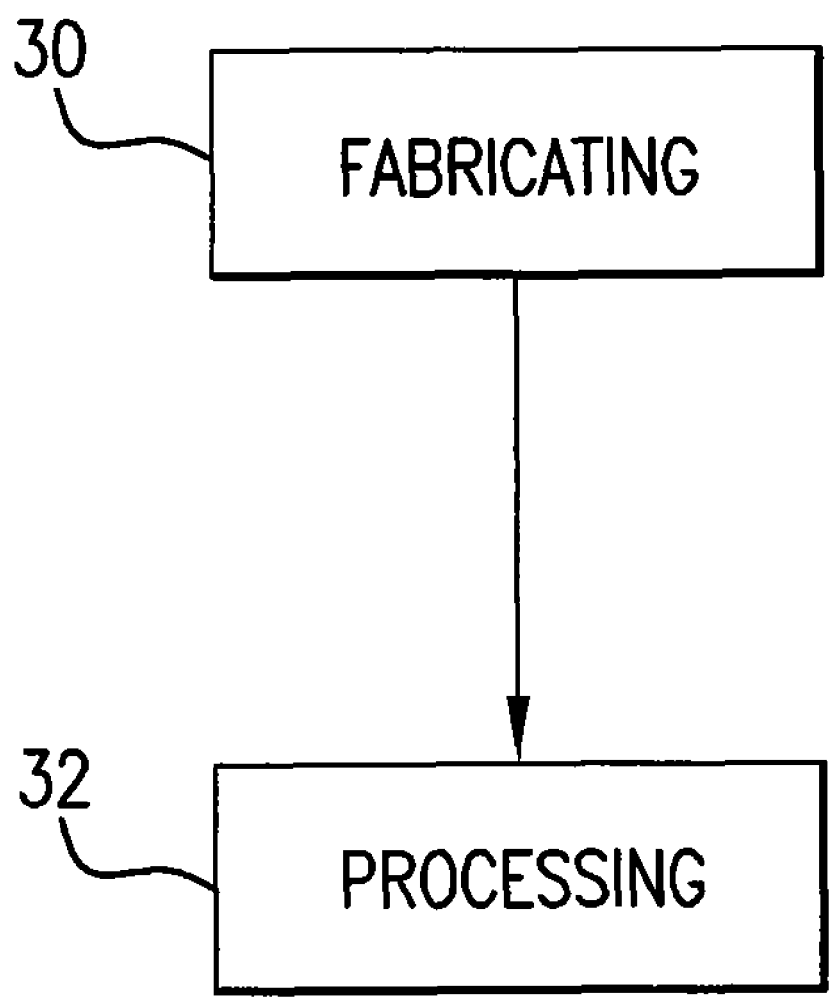
FIG. 3 is a flowchart representing an exemplary process of manufacturing an exemplary disk shaped component of the present disclosure.

Referring now to the flowchart of FIG. 3, the exemplary disk shaped components described herein may be manufactured at step 30 using any one of a number of techniques known to one of ordinary skill in the art. For example, suitable techniques may include rapid prototyping processes, rapid manufacturing processes such as 3-D printing methods, laser deposition techniques, fused deposition modeling, thermal spray techniques, investment casting, combinations comprising at least one of the foregoing methods, and the like. In addition to or in the alternative to direct fabrication of solid articles, disk shaped components exhibiting a residual porosity may be infiltrated, or back-filled, at step 32 with another desirable phase or combination of phases. An example of such fabrication techniques is disclosed in U.S. Pat. No. 6,228,437 to Schmidt. In addition to or in the alternative to direct fabrication of solid articles, the resultant disk shaped components may be subsequently processed (e.g. thermally, chemically, etc.) to convert one or more phases within the structure to another phase, or to completely remove one or more phases (e.g. leaching, melting, etc.). When completed, at least a portion, if not in their entirety, of the exemplary disk shaped components may also be coated. Representative suitable coatings include those in U.S. Pat. Nos. 6,924,040, 6,730,422, 6,284,323, 6,902,836, and 7,063,894 assigned to United Technologies Corporation, and incorporated by reference herein in their entirety. Coating architectures and deposition methods will be selected depending on the substrate composition (e.g. metal, ceramic, ceramic matrix composite, alloy, etc.).

Referring now to FIG. 4, a representation of an exemplary disk shaped component 40 described herein is shown. As discussed above, a disk shaped component requires increased mechanical integrity at and proximate to the bore while requiring increased resistance to thermal stresses at and proximate to the rim. Disk shaped component 40 may comprise a first material 42, or phase, disposed at or proximate to a center portion 44 having a bore 46. The first material may possess a coefficient of thermal expansion having a range of about 6 ppm/° F. to about 8 ppm/° F., a strength value having a range of about 80 ksi to about 150 ksi, and an oxidation resistance having a range of about 500° F. to about 800° F. In accordance with the exemplary process(es) described herein, the composite material may then be layered or graded to introduce materials possessing a coefficient of thermal expansion lower than the first material yet exhibit a greater oxidation resistance than the first material.

The next layer or graded material 48 may possess a coefficient of thermal expansion having a range of about 5.5 ppm/° F. to about 7.5 ppm/° F., a strength value having a range of about 70 ksi to about 140 ksi, and an oxidation resistance having a range of about 600° F. to about 900° F. The following layer or graded material 50 may possess a coefficient of thermal expansion having a range of about 5 ppm/° F. to about 7 ppm/° F., a strength value having a range of about 60 ksi to about 130 ksi, and an oxidation resistance having a range of about 700° F. to about 1000° F.

The rim may then be comprised of a second material 52 possessing a coefficient of thermal expansion that is less than the other materials in use, yet exhibiting an oxidation resistance that is greater than the other materials. As discussed above, the rim of a disk shaped component is exposed to the heated combustion gas and thus requires a material composition able to withstand stringent oxidation conditions. The second material 52 may possess a coefficient of thermal expansion having a range of about 4.5 ppm/° F. to about 6.5 ppm/° F., a strength value having a range of about 55 ksi to about 120 ksi, and an oxidation resistance having a range of about 800° F. to about 1100° F.

In accordance with the principles of present disclosure, the disk bore (i.e., first material 42) of the disk shaped component may be ideally composed of a material having a high coefficient of thermal expansion, a high strength value and a low oxidation resistance. In contrast, the disk rim (i.e., second material 52) of the same component may be ideally composed of a material having a comparably lower coefficient of thermal expansion, a lower strength value and a higher oxidation resistance. However, as one of ordinary skill in the art recognizes, factors such as costs, material availability, operating conditions and part specifications may dictate the choice of materials utilized to manufacture the exemplary disk shaped component described herein. Given these unknown factors, to achieve the greatest benefit of the present disclosure, the disk bore (i.e., first material 42) of the disk shaped component may at least be composed of a material having a relatively high coefficient of thermal expansion, given the operating conditions, etc., while the disk rim (i.e., second material 52) may at least be composed of a material having a high oxidation resistance, given the operating conditions, etc.

The exemplary disk shaped components described herein possess distinct advantages over disk shaped components of the prior art. First, the functionally graded materials used to manufacture these components may be tailored to exhibit the most advantageous combination of mechanical and thermal properties. The functionally graded materials used herein exhibit an advantageous combination of mechanical and thermal properties across a broad range of operating conditions. Secondly, the development of rapid manufacturing techniques have progressed to the point where the costs involved are comparable and commensurate with certain casting processes typically employed to manufacture disk shaped components. Other advantages and benefits to using functionally graded materials in constructing disk shaped components include the potential for significant weight reduction, tailorable erosion and abrasion resistance, and more efficient heat transfer.

One or more embodiments of the present invention have been described. Nevertheless, it will be understood that various modifications may be made without departing from the spirit and scope of the invention. Accordingly, other embodiments are within the scope of the following claims.

What is claimed is:

1. A disk shaped component, comprising:
a center portion having a bore; and
a rim concentrically disposed about said center portion, wherein said disk shaped component is formed by a composite material having at least a first material disposed proximate to said center portion forming a first layer of said disk shaped component and a second material disposed proximate to said rim forming a second layer of said disk shaped component,
wherein said first material comprises a first coefficient of thermal expansion, a first stress value and a first oxidation resistance, and said second material comprises a second coefficient of thermal expansion, a second stress value and a second oxidation resistance, wherein said first coefficient of thermal expansion is in a range of 6 ppm/° F. to 8 ppm/° F. and said second coefficient of thermal expansion is in a range of 4.5 ppm/° F. to 6.5 ppm/° F., said first stress value is greater than said second stress value and said first oxidation resistance is less than said second oxidation resistance.

2. The disk shaped component of claim 1, wherein said first material and said second material each comprise at least any one of the following materials: metal, metal alloy, ceramic, mixed powders, composite particle, multiple metals or ceramics, and combinations thereof, wherein said first material and said second material are different.

3. The disk shaped component of claim 1, wherein said first material and said second material exhibit different morphologies or different microstructures or both different morphologies and different microstructures.

4. The disk shaped component of claim 1, wherein said composite material further comprises a third layer formed from a third material and a fourth layer formed from a fourth material disposed between said first layer formed from said first material and said second layer formed from said second material.

5. The disk shaped component of claim 1, wherein said first material has a strength value in a range of 80 ksi to 150 ksi and an oxidation resistance in a range of 500° F. to 800° F.

6. The disk shaped component of claim 1, wherein said second material has a strength value in a range of 55 to 120 ksi and an oxidation resistance in a range of 800° F. to 1100° F.

7. The disk shaped component of claim 4, wherein said third material has a coefficient of thermal expansion in a range of 5.5 ppm/° F. to 7.5 ppm/° F., a strength value in a range of 70 to 140 ksi, and an oxidation resistance in a range of 600° F. to 900° F. and said fourth material has a coefficient of thermal expansion having a range of 5 ppm/° F. to 7 ppm/° F. a strength value in a range of 60 ksi to 130 ksi, and an oxidation resistance in a range of 700° F. to 1000° F.

* * * * *